Patented Aug. 27, 1946

2,406,431

UNITED STATES PATENT OFFICE 2,406,431

PROCESS FOR DEHYDRATING VEGETABLES

Martha W. Miller, Vacaville, Calif., assignor to Basic Vegetable Products Co., Vacaville, Calif., a copartnership composed of W. M. Hume and J. H. Hume No Drawing. Application November 9, 1942, Serial No. 465,083

5 Claims. (Cl. 99—204)

This invention relates to a dehydrated vegetable product and process and has for one of its objects a process of forming relatively large pieces of relatively brittle, dehydrated vegetables into bricks or the like without the addition of an artificial binder and substantially free from breakage of the pieces, and free from impairment of the flavor thereof.

Another object is the provision of self-sustaining, uniform sized, dry bricks or the like of normally relatively brittle slices or pieces of dehydrated onions, garlic, etc., in which the slices or pieces of onions retain substantially their individuality and readily separate into individual units, having all of the physical characteristics and flavor of the slices or chips prior to compression thereof into brick form, except for the added moisture, when hydrated as by placing a brick or portion thereof in water, and a still further object is the process of forming such bricks.

Other objects and advantages will appear in the specification annexed hereto.

The dehydration of onions and garlic and other vegetables, as by use of conventional tunnel driers and heated air in which the vegetables are subjected to temperatures from say about 130° F. to about 140° F., is old. The vegetables when dehydrated to the point where the moisture content is about three per cent of the total weight, are satisfactory for packaging in air-tight containers, but are brittle and are susceptible to breakage, particularly if an attempt is made to compress them into a confined space.

By ordinary drying and handling methods, which include inspection and removal of skin particles and other undesirable pieces, the dried onions may contain whole and partial slices and whole and partial rings from such slices. Dried onions where used as a body portion of any prepared food should be discrete pieces of as large a size as possible in the food. If packaged loose, the rings, "chips," and slices are susceptible to breakage in packaging and handling and are of appreciable bulk, and also any access of atmospheric air to the loose pieces will result in their rapid absorption of moisture in the air.

The process hereinafter describes results in a tightly compressed brick of self-sustaining form of onions, garlic and the like, and which product is less hygroscopic than heretofore, and in which the pieces retain their discrete form, but stick together without impairment in the flavor thereof and without use of a foreign binder.

In detail, referring specifically to onions, the onions are first cleaned, skinned and sliced in the ordinary manner, and are then introduced into the drier in which they are subjected to a temperature of from about 130° F. to about 140° F. until the moisture remaining is about three per cent of the weight. They are then removed from the drier, and inspected to remove any pieces of skin, and woody, discolored or other objectionable matter.

The next step is to heat the dry, inspected pieces to about 130° F. to about 140° F., the latter being preferable, and to subject the pieces at about this temperature to humid air until additional moisture of about .2% to .4% by weight of the pieces is carried thereby, or for example, until the moisture carried thereby is from about 3.2% to about 3.5% by weight of the total.

This step is carefully controlled and the heating and hydrating is preferably simultaneous, as in a humidifier in which the pieces of onion are placed and into which steam of predetermined wetness is introduced.

After the moisture content has been increased as above noted, the onion pieces while still heated to say from about 125° F. to about 140° F. are compressed into bricks by any conventional press and the walls of the press may be the sides of a carton or package supported against wall forms, so that the packaging and compression of the pieces into brick form may be simultaneous. The heating of the pieces and the addition of the moisture results in a brick in which the pieces will adhere to each other, but automatically will separate into discrete units upon soaking, and in which there is relatively little breakage in the pieces and practically no powdering or crumbling thereof, as occurs were the pieces compressed after the inspection step mentioned.

It is, of course, obvious that the less handling that is done after the onions are sliced, the more complete will be the slices upon compression thereof into brick form, and upon use, but the greater will be the tendency to breakage of the rings that make up the slices. However, with this process the breakage is reduced to a minor amount and the ultimate bricks will be made up of relatively large pieces.

This invention is not restricted to the forming of bricks of any particular shape, such as rectangular, since they may be in the form of cylinders, or in the form of relatively thick disks of predetermined weight to provide measured servings. Thus the term "bricks" is not used to define shape, but to define units of compacted pieces of onions, garlic, etc., of any desired shape, each of which bricks is self-sustaining without outside support.

The very small amount of moisture taken up by the pieces of dehydrated onions or garlic or the like, or an amount preferably about two to three tenths (.2 to .3) per cent of the weight of the pieces treated, does not increase the moisture carried by the pieces to a noticeable degree beyond three and five tenths (3.5) per cent and the product when cooled is indistinguishable from the product prior to the addition, in its physical characteristics and keeping qualities and flavor.

It is important that the addition of moisture as above noted be accomplished in a humidifier in which there is an accurate control as to the humidity of the gas, which is preferably air or steam. The relatively moist air thus envelopes all pieces in the humidifier equally and there is an even distribution of the moisture to the pieces which are removed and compressed into brick form while still at a temperature substantially above atmospheric temperature, but preferably not in excess of about 140° F.

After the bricks are formed, they may be cooled artificially as by controlled refrigeration to substantially atmospheric temperature, or the heat may be naturally dissipated into the atmosphere, but they are preferably either sealed in wrappers of regenerated cellulose or chlorinated rubber or in substantially air-tight tins. However, the product in brick form is far less hygroscopic than where the pieces are loose, and are not susceptible to objectionable rapid impairment from absorption of moisture in the atmosphere in a temperate climate before the product is used up in normal use. The formation of the pieces into bricks, as herein described, makes possible a pure, unadulterated and unimpaired product in compact convenient sizes for either household or restaurant use.

Having described my invention, I claim:

1. The process of forming bricks from discrete pieces of onions, garlic having a moisture content of substantially three per cent by weight thereof that comprises subjecting said pieces to the direct influence of moist steam in an atmosphere of a temperature from about 125° F. to about 140° F. until they have absorbed moisture from about .2% to about .3% by weight thereof and substantially immediately thereafter compacting said pieces into brick form.

2. The process of forming bricks from discrete pieces of relatively brittle, partially dehydrated onions, garlic that comprises heating said pieces to about 125° to 140° F., and at the same time adding moisture to said pieces in an amount equal to about .2% to .3% of the weight of said pieces and thereafter compacting said pieces into brick form before appreciable cooling of said pieces.

3. The process of forming onion bricks that comprises the steps of, dehydrating slices of raw onions until the moisture content thereof is between 3% and 3.5% of the weight thereof; heating the slices so dried to a temperature of from about 125° F. to about 140° F. free from further drying and without increasing the moisture content above 3.5% by weight; and then packing said slices by compression at about said temperature and at about said moisture content.

4. The process of pressure packing dehydrated normally brittle onion chips free from breakage thereof that comprises subjecting said chips to the influence of heat while maintaining the moisture content of said chips between 3% and 3.5% thereof by weight and immediately thereafter compressing said chips before cooling into brick form in a package at substantially said temperature and free from any decrease in moisture content and free from increase in moisture content 3.5%.

5. The process of pressure packing onion slices into a substantially self-sustaining brick substantially free from breakage of the slices that comprises the steps of dehydrating such slices until the moisture content thereof is between 3% and 3.5% thereof by weight thereby forming said slices into relatively large brittle readily breakable onion chips, heating said brittle chips in a humid gas to a temperature substantially above normal atmospheric temperature, removing said chips from said gas while the moisture content of said chips is substantially 3.5% thereof by weight and then compressing them at substantially said temperature into a package free from addition of moisture thereto and at a pressure sufficient to cause adherence between chips.

MARTHA W. MILLER.